(12) United States Patent
Mutsuda et al.

(10) Patent No.: US 9,562,166 B2
(45) Date of Patent: Feb. 7, 2017

(54) STRUCTURE AND PAINT FOR FORMING SURFACE COAT LAYER

(71) Applicant: IBIDEN CO., LTD., Ogaki-shi (JP)

(72) Inventors: Fumiyuki Mutsuda, Ibi-gun (JP); Yoshitaka Fujita, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 180 days.

(21) Appl. No.: 14/511,182

(22) Filed: Oct. 10, 2014

(65) Prior Publication Data

US 2015/0104611 A1 Apr. 16, 2015

(30) Foreign Application Priority Data

Oct. 10, 2013 (JP) ................... 2013-213254

(51) Int. Cl.

| | |
|---|---|
| *C09D 101/28* | (2006.01) |
| *C03C 8/14* | (2006.01) |
| *C03C 8/20* | (2006.01) |
| *F01N 13/10* | (2010.01) |
| *F01N 13/08* | (2010.01) |

(Continued)

(52) U.S. Cl.

CPC ............... *C09D 101/28* (2013.01); *C03C 8/14* (2013.01); *C03C 8/20* (2013.01); *C08K 3/22* (2013.01); *C08K 3/38* (2013.01); *C23D 5/00* (2013.01); *C23D 5/005* (2013.01); *F01N 13/08* (2013.01); *F01N 13/102* (2013.01); *F01N 13/14* (2013.01); *F01N 13/16* (2013.01); *C03C 2207/04* (2013.01); *C03C 2207/06* (2013.01); *C08K 2003/2227* (2013.01); *F01N 2510/02* (2013.01);

(Continued)

(58) Field of Classification Search

CPC .......... F01N 13/08; F01N 13/14; F01N 13/16; F01N 2510/02; Y10T 428/24612; Y10T 428/24372; C08K 2003/2227; C08K 3/22; C08K 3/38; F16L 9/14; C23D 5/00; C23D 5/005; C09D 101/28; C03C 3/122; C03C 8/16

See application file for complete search history.

(56) References Cited

U.S. PATENT DOCUMENTS

| | | | |
|---|---|---|---|
| 5,223,236 A * | 6/1993 | Inoue ................... | B01D 53/945 423/213.2 |
| 2001/0009692 A1 | 7/2001 | Watanabe | |
| 2012/0202045 A1* | 8/2012 | Mutsuda ................... | B32B 1/08 428/318.4 |

FOREIGN PATENT DOCUMENTS

| | | |
|---|---|---|
| CN | 101144189 | 3/2008 |
| CN | 102121105 | 7/2011 |

(Continued)

*Primary Examiner* — Catherine A Simone
(74) *Attorney, Agent, or Firm* — Mori & Ward, LLP

(57) ABSTRACT

A structure includes a surface coat layer of which the thickness on a bump such as a weld bead and a weld spatter or an edge portion, possibly formed on the surface of a base, is not greatly different from the thickness on a flat portion. The structure therefore has excellent properties including heat insulation properties and electrical insulation properties. The structure includes a base that is made of a metal, and has a flat portion and at least one of a bump and an edge portion on a surface; and a surface coat layer that is formed from an amorphous inorganic material and particles of a crystalline inorganic material, and covers the surface of the base, the surface coat layer including a first coat portion covering the flat portion and a second coat portion covering the at least one of a bump and an edge portion.

11 Claims, 4 Drawing Sheets

(51) Int. Cl.
 *F01N 13/14* (2010.01)
 *F01N 13/16* (2010.01)
 *C08K 3/22* (2006.01)
 *C08K 3/38* (2006.01)
 *C23D 5/00* (2006.01)

(52) U.S. Cl.
 CPC .................. *Y10T 428/24372* (2015.01); *Y10T 428/24612* (2015.01)

(56) References Cited

FOREIGN PATENT DOCUMENTS

| | | |
|---|---|---|
| CN | 102635430 | 8/2012 |
| CN | 102678249 | 9/2012 |
| EP | 2213856 | 8/2010 |
| EP | 2474719 | 7/2012 |
| JP | 2008-069383 | 3/2008 |
| JP | 2009-133213 | 6/2009 |
| JP | 2009-133214 | 6/2009 |
| WO | WO 2010/008577 | 1/2010 |

* cited by examiner

A-A line cross-sectional view

B-B line cross-sectional view

STRUCTURE AND PAINT FOR FORMING SURFACE COAT LAYER

CROSS-REFERENCE TO RELATED APPLICATIONS

The present application claims priority under 35 U.S.C. §119 to Japanese Patent Application No. 2013-213254, filed Oct. 10, 2013. The contents of this application are incorporated herein by reference in their entirety.

BACKGROUND OF THE INVENTION

Field of the Invention

The present invention relates to a structure and a paint for forming a surface coat layer.

Discussion of the Background

A catalytic converter is provided in the path of an exhaust pipe to treat toxic substances contained in exhaust gas discharged from an engine.

It is necessary to maintain the temperatures of exhaust gas, an exhaust pipe through which the exhaust gas passes, and the like at temperatures suitable for catalytic activation (hereinafter, also referred to as catalyst activation temperatures) in order to improve conversion efficiency of toxic substances by a catalytic converter.

In a conventional exhaust gas purifying system, the temperature of the catalytic converter at the start of the engine is lower than the catalyst activation temperature, and thus the catalyst fails to provide its functions. It has therefore been difficult to completely prevent toxic substances from being discharged at the start of the engine.

For this reason, it is required to raise the temperature of an exhaust pipe connected to an engine to the catalyst activation temperature in a short time after the start of the engine.

JP 2008-69383 A, JP 2009-133213 A, and JP 2009-133214 A each deal with the above problem by providing a structure that includes a base made of a metal and an inorganic material surface layer made of crystalline and amorphous inorganic materials. The inorganic material surface layer has lower heat conductivity than the base but has a higher infrared radiation rate than the base.

SUMMARY OF THE INVENTION

The structure of an embodiment of the present invention features a base that is made of a metal, and has a flat portion and at least one of a bump and an edge portion on a surface; and a surface coat layer that is formed from an amorphous inorganic material and particles of a crystalline inorganic material, and covers the surface of the base, the surface coat layer including a first coat portion covering the flat portion and a second coat portion covering the at least one of a bump and an edge portion, the surface coat layer having a thickness ratio of the second coat portion to the first coat portion (second coat portion thickness/first coat portion thickness) of from 0.4 to less than 1.0, the particles of the crystalline inorganic material having an average particle size of from 0.1 to 50 μm.

Hereinafter, the at least one of the bump and the edge portion herein is also referred to as "a portion such as a bump". Also, a simple expression of "surface coat layer" refers to a surface coat layer including both the first coat portion and the second coat portion.

The average particle size of particles of a crystalline inorganic material herein is the average particle size of particles of a crystalline inorganic material measured with Laser Diffraction Particle Size Analyzer (SALD-300V) from Shimadzu Corporation before mixing of the particles with the materials for forming a surface coat layer.

The structure of the embodiment of the present invention includes a base and a surface coat layer that is formed from an amorphous inorganic material and particles of a crystalline inorganic material, the surface coat layer having a thickness ratio of the second coat portion to the first coat portion (second coat portion thickness/first coat portion thickness) of from 0.4 to less than 1.0, the particles of the crystalline inorganic material having an average particle size of from 0.1 to 50 μm. Accordingly, in a melt layer formed by melting a coating layer of a paint containing an amorphous inorganic material and a crystalline inorganic material under heat, the surface area of the particles of the crystalline inorganic material is in a suitable range. Also, the coating layer in the molten state has viscosity which is not excessively low and is maintained in a suitable range, so that the coating layer in the molten state on a bump is not likely to flow onto a flat portion. Thus, the surface coat layer of the resulting structure has thicknesses not greatly different in the first coat portion formed on a flat portion and the second coat portion formed on a portion such as a bump. As a result, the whole structure can provide excellent properties including heat insulation properties and electrical insulation properties.

In the whole structure of the embodiment of the present invention, the surface coat layer preferably has a thickness ratio of the second coat portion to the first coat portion (second coat portion thickness/first coat portion thickness) of from 0.4 to less than 1.0 in order to provide excellent properties including heat insulation properties and electrical insulation properties.

If the thickness ratio of the second coat portion to the first coat portion (second coat portion thickness/first coat portion thickness) is lower than 0.4, the heat conductivity of the surface coat layer on a bump and an edge portion deteriorates to cause insufficient heat conductivity of the whole structure, resulting in deterioration of the heat resistance. In contrast, if the thickness ratio of the second coat portion to the first coat portion (second coat portion thickness/first coat portion thickness) is 1.0 or higher, the thickness of the surface coat layer in the second coat portion on a bump or an edge portion is excessively large. As a result, the flow of gases such as exhaust gas flowing over the surface coat layer is inhibited, which adversely affects the pressure loss. Also, a turbulent flow is caused, which may possibly increase the coefficient of heat transfer between gases such as exhaust gas and the structure, adversely affecting the heat insulation properties.

Hereinafter, a melt layer refers to a melt layer formed by mixing particles of an amorphous inorganic material and particles of a crystalline inorganic material to prepare a paint composition, applying the paint composition to the surface of a base, and heating the composition.

The bump herein is, in a cross section perpendicular to the base surface, a part surrounded by a base surface line and a virtual surface line in a region where the base surface line and the virtual surface line are different from one another.

The thickness of the second coat portion on bumps is determined by drawing a perpendicular line to a tangent line of each tangent point on the base surface line defining each bump; randomly selecting 10 perpendicular lines each including a line segment that is bounded by the corresponding tangent point and a point on the surface of the structure and crosses only the second coat portion; and averaging the lengths of the line segments included by the perpendicular lines. In the case of measurement using DUALSCOPE MP40 from Fischer Instruments K.K., for example, the thickness is determined by calibrating the thickness based on readings at any 30 points, measuring the thickness at 10 points, and averaging the readings at those points. For the measurement of the thickness at 10 points, the 10 points are preferably randomly selected without concentration of measurement points within the measurement region. For example, the measurement can be performed at equal intervals of 1 mm.

Here, the base surface line is a line actually forming the surface of the base in a cross section perpendicular to the base surface. The virtual surface line is a line drawn by extending the base surface line of the flat portions in a cross section perpendicular to the base surface.

That is, the bump herein is, in an enlarged cross-sectional view of the vicinity of a bump in a structure as illustrated in FIG. 1B or an enlarged cross-sectional view of the vicinity of a bump in a half-cut member as illustrated in FIG. 2C, a part surrounded by a base surface line 11A and a virtual surface line 11B or by a base surface line 22A and a virtual surface line 22B in a region where the base surface lines 11A and 22B are different from the respective corresponding virtual surface lines 11B and 22B.

Also, the edge portion herein is, in a cross section perpendicular to the base surface, a part surrounded by an edge portion surface segment formed by a base surface line in a region where the base surface line and virtual surface lines are different from one another except for bumps, and perpendicular lines which are perpendicular to the respective tangent lines at the end points of the edge portion surface segment on the base surface line.

That is, the edge portion herein is, in an enlarged cross-sectional view of the vicinity of an edge portion of a structure as illustrated in FIG. 10, a part surrounded by an edge portion surface segment formed by a base surface line 11C in a region where the base surface line 11C and virtual surface lines 11D are different from one another, and perpendicular lines G which are perpendicular to the respective tangent lines at points 11P (end points) of the edge portion surface segment on the base surface line 11C.

The thickness of the second coat portion on an edge portion is determined by drawing perpendicular lines to tangent lines of 10 randomly selected tangent points on the base surface line, and averaging the lengths of line segments which are included in the perpendicular lines and are bounded by the respective corresponding tangent points and points on the surface of the structure. In the case of measurement using DUALSCOPE MP40 from Fischer Instruments K.K., for example, the thickness is determined by calibrating the thickness based on readings at any 30 points, measuring the thickness at 10 points, and averaging the readings at those points.

For the measurement of the thickness at 10 points, the points are preferably randomly selected without concentration of measurement points within the measurement region. For example, the measurement can be performed at equal intervals of 1 mm.

The particles of the crystalline inorganic material preferably constitute from 5% by weight to less than 20% by weight of the surface coat layer.

If the particles of the crystalline inorganic material constitute from 5% by weight to less than 20% by weight of the surface coat layer, the amount of the amorphous inorganic material per unit volume is in a suitable range, and the probability of collisions between the particles of the crystalline inorganic material is low. As a result, the crystalline inorganic material is less likely to agglomerate and have an increased dispersibility, which facilitates formation of a uniform film. This will result in a surface coating layer excellent in high temperature strength, heat insulation properties, and electrical insulation properties.

The percentage by weight of the particles of a crystalline inorganic material in the surface coat layer is calculated from the following formula (1) using the particles of a crystalline inorganic material and the amorphous inorganic material constituting the surface coat layer.

[Weight of particles of crystalline inorganic material/ (weight of particles of crystalline inorganic material+weight of amorphous inorganic material)]×100    (1)

The particles of the crystalline inorganic material contained in the surface coat layer preferably have an average particle size of from 0.1 μm to less than 10 μm.

If the average particle size of the particles of a crystalline inorganic material contained in the surface coat layer is from 0.1 μm to less than 10 μm, the contact area of the crystalline inorganic material to the amorphous inorganic material in the molten state is large. This allows the melt layer to have a relatively large viscosity, so that the thickness of the surface coat layer on the flat portions is less likely to be thin. As a result, a surface coat layer having a thickness not greatly different from its thickness on a flat portion can be formed on a portion such as a bump.

In the structure of the embodiment of the present invention, the first coat portion preferably has a thickness of from 50 to 1000 μm.

Formation of a surface coat layer having the above thickness in the first coat portion enables formation of a surface coat layer having sufficiently high heat insulation properties throughout the layer, resulting in production of a structure having excellent properties including heat insulation properties and electrical insulation properties.

In the structure of the embodiment of the present invention, an overcoat layer is formed on the surface coat layer. The overcoat layer may or may not contain a crystalline inorganic material. If the overcoat layer contains a crystalline inorganic material, particles of the crystalline inorganic material preferably have an average particle size of from 0.1 to 50 μm, and preferably constitute from 0.1 to 20% by weight of the overcoat layer.

Formation of an overcoat layer having low viscosity when molten under heat on the surface coat layer enables formation of a smoother layer having small surface roughness, and allows smooth flow of gases such as exhaust gas flowing over the overcoat layer. Accordingly, the coefficient of heat transfer between gases such as exhaust gas and the structure is low, and therefore the heat insulation properties can be improved.

In the structure of the embodiment of the present invention, the overcoat layer preferably has a surface roughness $Rz_{JIS}$ measured at a measurement interval of 10 mm in accordance with JIS B 0601 (2001) of from 0.05 to 10 μm.

If the overcoat layer has a surface roughness $Rz_{JIS}$ measured at a measurement interval of 10 mm in accordance with JIS B 0601 (2001) of from 0.05 to 10 μm, the surface of the structure (the surface of the overcoat layer) is smoother, which allows gases flowing over the overcoat layer to flow more smoothly. Accordingly, the coefficient of heat transfer between gases such as exhaust gas and the structure is low, and therefore the heat insulation properties can be improved.

In the structure of the embodiment of the present invention, the crystalline inorganic material preferably contains at least one selected from the group consisting of calcia, magnesia, ceria, alumina, and an oxide of a transition metal.

If the surface coat layer of the structure of the embodiment of the present invention contains any of the above compounds as the crystalline inorganic material, generation of defects such as cracks due to deterioration of the mechanical strength of the surface coat layer can be prevented because particles of the crystalline inorganic material have excellent heat resistance and mechanically strengthen the surface coat layer. Especially, an oxide of aluminum, when used as the crystalline inorganic material, contributes to improvement of the electrical insulation properties of an exhaust pipe.

Also, if the surface coat layer contains an oxide of a transition metal as the crystalline inorganic material, the oxide of a transition metal, having a high infrared emissivity, gives a high infrared emissivity to the surface coat layer, and also contributes to excellent adhesion of the surface coat layer to the base.

In the structure of the embodiment of the present invention, the crystalline inorganic material preferably contains at least one selected from the group consisting of $\alpha$-alumina and yttria-stabilized zirconia.

If the surface coat layer contains any of the above compounds as the crystalline inorganic material, the compound gives better heat resistance, mechanically strengthens the surface coat layer, and contributes to improvement of the electrical insulation properties of the structure.

In the structure of the embodiment of the present invention, the amorphous inorganic material preferably contains low melting glass that has a softening point of from 300° C. to 1000° C.

If the amorphous inorganic material in the structure of the embodiment of the present invention contains low melting glass that has a softening point of from 300° C. to 1000° C., the surface coat layer can be relatively easily formed by forming a coating layer on the surface of the base by coating or the like method, and heating the coating layer.

If the low melting glass has a softening point of lower than 300° C. which is excessively low as a softening point, the layer for forming the surface coat layer under heat is molten, for example, to easily flow to make it difficult to form a layer with a uniform thickness. In contrast, if the low melting glass has a softening point of higher than 1000° C., it is necessary to set the temperature for the heating at a very high temperature, and the heating may deteriorate the mechanical properties of the base. Also in this case, the surface coat layer containing an amorphous inorganic material may not be able to conform to the thermal expansion of the base due to the high temperature, and thus cracks may form in the surface coat layer to lead to peeling of the layer.

In the structure of the embodiment of the present invention, the low melting glass preferably contains at least one of barium glass, boron glass, strontium glass, alumina-silica glass, soda zinc glass, and soda barium glass.

If the low melting glass containing any of the above materials is used as the amorphous inorganic material in the structure of the embodiment of the present invention, a surface coat layer having heat resistance, durability, electrical insulation properties, and low heat conductivity can be formed on the surface of the base.

In the structure of the embodiment of the present invention, a bump may be formed by at least one of a weld bead and a weld spatter.

In the structure of the embodiment of the present invention, a bump is formed by a weld bead or a weld spatter in many cases, and the surface coat portion can have thicknesses not greatly different in the second coat portion formed on the surface of such a bump and in the first coat portion formed on a flat portion. As a result, the whole structure can achieve the effects of the embodiment of the present invention, namely excellent properties including heat insulation properties and electrical insulation properties.

The paint for forming a surface coat layer according to the embodiment of the present invention is a paint for forming a surface coat layer, the surface coat layer formed on a base that is made of a metal, and has a flat portion and at least one of a bump and an edge portion on a surface, the paint containing an amorphous inorganic material and particles of a crystalline inorganic material, the crystalline inorganic material having an average particle size of from 0.1 to 50 μm.

Since the paint for forming a surface coat layer according to the embodiment of the present invention contains an amorphous inorganic material and particles of a crystalline inorganic material, and the particles of the crystalline inorganic material have an average particle size of from 0.1 to 50 μm, forming a coating layer using the paint and heating the coating layer can results in formation of a melt layer having a viscosity in a suitable range, so that a surface coat layer having thicknesses not greatly different on a flat portion and a portion such as a bump can be formed. Accordingly, a structure having excellent properties including heat insulation properties and electrical insulation properties can be obtained.

The particles of the crystalline inorganic material contained in the paint preferably have an average particle size of from 0.1 μm to less than 10 μm.

The crystalline inorganic material preferably constitutes from 5% by weight to less than 20% by weight of the total amount of the amorphous inorganic material and the crystalline inorganic material contained in the paint for forming a surface coat layer of the embodiment of the present invention.

If the crystalline inorganic material constitutes from 5% by weight to less than 20% by weight of the total amount of the amorphous inorganic material and the crystalline inorganic material contained in the paint for forming a surface coat layer of the embodiment of the present invention, the amount of the amorphous inorganic material per unit volume is in a suitable range, and also the probability of collisions between the particles of the crystalline inorganic material is low. As a result, the crystalline inorganic material is less likely to agglomerate and have an increased dispersibility, which facilitates formation of a uniform film. This will result in a surface coating layer excellent in high temperature strength, heat insulation properties, and electrical insulation properties.

In the paint of the embodiment of the present invention, the particles of the crystalline inorganic material are preferably particles of at least one selected from the group consisting of calcia, magnesia, ceria, alumina, and an oxide of a transition metal.

If the paint of the embodiment of the present invention contains any of the above compounds as the crystalline inorganic material, generation of defects such as cracks due to deterioration of the mechanical strength of the surface coat layer can be prevented because particles of the crystalline inorganic material have excellent heat resistance and mechanically strengthen the surface coat layer. Especially, an oxide of aluminum, when used as the crystalline inorganic material, contributes to improvement of the electrical insulation properties of an exhaust pipe.

Also, if the paint contains an oxide of a transition metal as the crystalline inorganic material, the oxide of a transition metal, having a high infrared emissivity, gives a high infrared emissivity to the surface coat layer, and also contributes to excellent adhesion of the surface coat layer to the base.

In the paint of the embodiment of the present invention, the amorphous inorganic material preferably contains low melting glass that has a softening point of 300 to 1000° C.

If the amorphous inorganic material in the paint of the embodiment of the present invention contains low melting glass that has a softening point of from 300° C. to 1000° C., a surface coat layer can be relatively easily formed by forming a coating layer on the surface of the base by coating or the like method, and heating the coating layer.

In the paint of the embodiment of the present invention, the low melting glass preferably contains at least one of barium glass, boron glass, strontium glass, alumina-silica glass, soda zinc glass, and soda barium glass.

If the low melting glass containing any of the above materials is used as the amorphous inorganic material in the paint of the embodiment of the present invention, a surface coat layer having heat insulation properties, durability, electrical insulation properties, and low heat conductivity can be formed on the surface of the base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
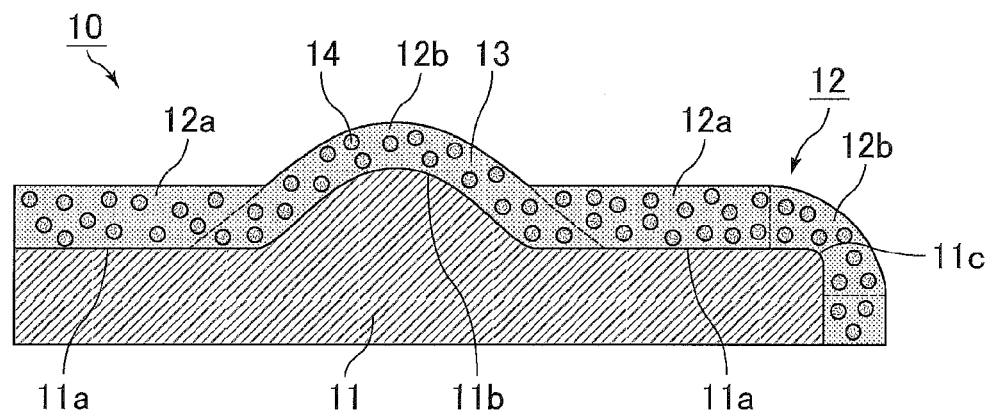
FIG. 1A is a cross-sectional view schematically illustrating an example of the structure of the embodiment of the present invention.

The embodiments will now be described with reference to the accompanying drawings, wherein like reference numerals designate corresponding or identical elements throughout the various drawings.

(Detailed Description)

Hereinafter, the embodiment of the present invention is described in detail. The present invention, however, is not limited by the following description, and appropriate changes may be made without departing from the scope of the present invention.

In the following, the structure and the paint for forming a surface coat layer used in production of a structure according to the embodiment of the present invention are described.

First, the structure of the embodiment of the present invention is described.

The structure of the embodiment of the present invention includes a base that is made of a metal, and has a flat portion and at least one of a bump and an edge portion on a surface; and a surface coat layer that is formed from an amorphous inorganic material and particles of a crystalline inorganic material, and covers the surface of the base, the surface coat layer including a first coat portion covering the flat portion and a second coat portion covering the at least one of a bump and an edge portion, the surface coat layer having a thickness ratio of the second coat portion to the first coat portion (second coat portion thickness/first coat portion thickness) of from 0.4 to less than 1.0, the particles of the crystalline inorganic material having an average particle size of from 0.1 to 50 μm.

Figure 1B:
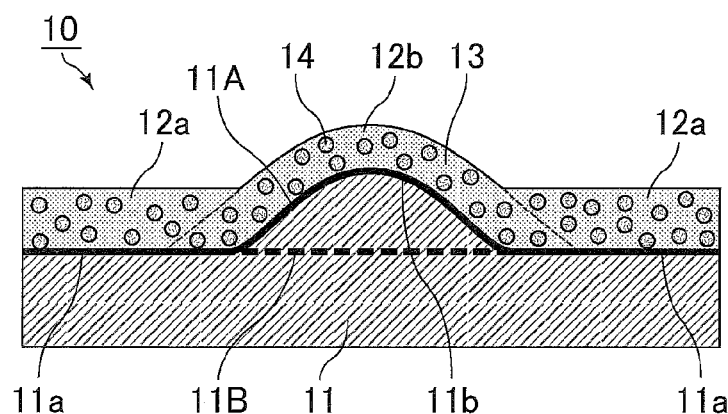
FIG. 1B is an enlarged cross-sectional view of the vicinity of a bump in the structure illustrated in FIG. 1A.
Figure 1C:
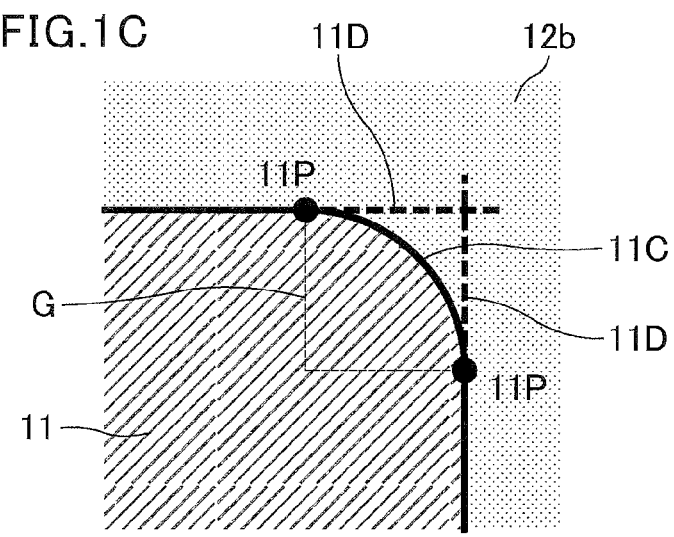
FIG. 1C is an enlarged view of the vicinity of an edge portion in the structure illustrated in FIG. 1A.

FIG. 1A is a cross-sectional view schematically illustrating an example of the structure of the embodiment of the present invention; FIG. 1B is an enlarged cross-sectional view of the vicinity of a bump in the structure illustrated in FIG. 1A; and FIG. 1C is an enlarged view of the vicinity of an edge portion in the structure illustrated in FIG. 1A.

The structure 10 illustrated in FIG. 1A includes a base 11 that is made of a metal and has a flat portion 11a, a bump 11b, and an edge portion 11c on its surface; and a surface coat layer 12 formed on the surface of the base 11.

In the structure 10 illustrated in FIG. 1A, the surface coat layer 12 formed on the surface of the base 11 is formed from an amorphous inorganic material layer 13 and particles 14 of a crystalline inorganic material dispersed in the amorphous inorganic material layer 13. The structure 10, however, may contain air bubbles or any other substances in the amorphous inorganic material layer 13.

The surface coat layer 12 includes a first coat portion 12a covering the flat portion 11a and second coat portions 12b covering the bump 11b and the edge portion 11c. The surface coat layer 12 has a thickness ratio of the second coat portions 12b to the first coat portion 12a (second coat portion thickness/first coat portion thickness) of from 0.4 to less than 1.0, and the particles 14 of the crystalline inorganic material contained in the surface coat layer 12 have an average particle size of from 0.1 to 50 μm.

The base 11 used in the embodiment of the present invention is a member on which the surface coat layer 12 is to be formed. The base 11 may have a plate shape, a semicylindrical shape, a cylindrical shape, or any other shape, and the cross section thereof may have any peripheral shape such as an oval shape or a polygonal shape.

If the base 11 is a tubiform body, the diameter of the base may not be constant in the longitudinal direction, and the cross-sectional shape of the base perpendicular to the longitudinal direction may not be constant in the longitudinal direction.

The base 11 has the bump 11b and the edge portion 11c formed thereon.

The bump 11 is not particularly limited, and a weld bead or weld spatter generated by welding corresponds to the bump 11b. The base 11 has main faces, each occupying a large area, on the front side and the back side. Typically, the surface coat layer 12 is formed on either one of the main faces, but may be formed on both of the main faces. Also in some cases, a surface coat layer may be required on side face(s) of the base 11 as well as the main face(s) of the base 11. In such a case, the surface coat layer also covers the edge portion 11c. The edge portion exists as a portion to be covered when, for example, part of the exhaust pipe is a double pipe including an inner pipe formed inside and a surface coat layer is formed on the side face(s) of the inner pipe.

In the structure 10 illustrated in FIG. 1A, the base 11 has the bump 11b and the edge portion 11c, but may have only one of the bump 11b and the edge portion 11c.

The height of the bump 11b is assumed to be from 0.01 to 15 mm, and the width of the bump 11b is assumed to be from 0.01 to 20 mm. The angle of the edge portion 11c in a cross section obtained by cutting the main face of the base 11 perpendicularly is typically 90°. Still, the angle of the edge portion 11c is not limited to 90°, and may be any angle if it is in the range of from 70° to 110°.

The material of the base 11 constituting the structure 10 is, for example, a metal such as stainless steel, steel, iron, and copper, or an alloy such as a nickel alloy (e.g. Inconel, Hastelloy, Invar). The adhesion between the surface coat layer 12 and the base 11 made of a metal can be increased as described below by bringing the coefficient of thermal expansion of the base and that of the amorphous inorganic material layer 13 close to one another.

For good adhesion to the surface coat layer, the base may be subjected to a roughening treatment such as sandblast treatment and chemical agent treatment.

The surface roughness $Rz_{JIS}$ of the surface of the base after the roughening treatment is preferably from 1.5 to 20 μm. The surface roughness $Rz_{JIS}$ of the above roughened surface is a ten point height of roughness profile defined in JIS B 0601 (2001), with a measurement interval of 10 mm.

If the surface roughness $Rz_{JIS}$ of the roughened surface of the base of the structure is less than 1.5 μm, the surface area of the base is small, which makes it difficult to achieve sufficient adhesion between the base and the surface coat layer. In contrast, if the surface roughness $Rz_{JIS}$ of the roughened surface of the base of structure is more than 20 μm, a surface coat layer is not likely to be formed on the surface of the base. This is probably because, if the surface roughness $Rz_{JIS}$ of the roughened surface of the base of the structure is excessively large, the slurry (material composition for a surface coat layer) does not enter the recessed portions of the irregularities formed on the surface of the base, which forms gaps in these portions.

The surface roughness $Rz_{JIS}$ of the roughened surface of the base of the structure can be measured with HANDY-SURF E-35B from TOKYO SEIMITSU CO., LTD. in accordance with JIS B 0601 (2001) with a measurement interval of 10 mm.

In the structure of the embodiment of the present invention, the lower limit for the thickness of the base is preferably 0.2 mm, and more preferably 0.4 mm, while the upper limit is preferably 10 mm, and more preferably 4 mm.

If the thickness of the base of the structure is smaller than 0.2 mm, the strength of the structure is insufficient. If the thickness of the base of the structure is greater than 10 mm, the weight of the structure is large, and such a structure could not be easily mounted on a vehicle such as a passenger car, being unsuitable for practical use.

The particles 14 of a crystalline inorganic material preferably contain at least one selected from the group consisting of calcia, magnesia, ceria, alumina, and an oxide of a transition metal.

Examples of the oxide of a transition metal include zirconia, yttria, niobium oxide, titania, chrome oxide, manganese oxide, iron oxide, copper oxide, cobalt oxide, and chrome oxide.

Specific examples of the inorganic material containing zirconia include yttria-stabilized zirconia, CaO-stabilized zirconia, MgO-stabilized zirconia, zircon, and CeO-stabilized zirconia.

In particular, alumina and yttria-stabilized zirconia which have excellent heat resistance and excellent corrosion resistance are preferred.

The surface coat layer in the embodiment of the present invention has a thickness ratio of the second coat portions 12b to the first coat portion 12a (second coat portion thickness/first coat portion thickness) of from 0.4 to less than 1.0. If the surface coat layer has a thickness ratio of the second coat portions 12b to the first coat portion 12a of lower than 0.4, the thickness of the second coat portions 12b provided on a portion such as a bump is excessively small to deteriorate heat insulation, eventually deteriorating the heat insulation properties and the other properties of the whole surface coat layer.

If the surface coat layer has a thickness ratio of the second coat portions 12b to the first coat portion 12a of 1.0 or higher, the thickness of the surface coat layer in the second coat portions 12b on the bump and the edge portion is excessively large. As a result, the flow of gases such as exhaust gas flowing over the surface coat layer is inhibited, which adversely affects the pressure loss. Also, a turbulent flow is caused, which may possibly increase the coefficient of heat transfer between gases such as exhaust gas and the structure, adversely affecting the heat insulation properties.

In order for the structure 10 of the embodiment of the present invention to achieve excellent properties including heat insulation properties and electrical insulation properties, the thickness ratio of the second coat portions 12b to the first coat portion 12a (second coat portion thickness/first coat portion thickness) is preferably as large as possible, and more preferably from 0.6 to less than 1.0.

The particles 14 of the crystalline inorganic material have an average particle size of from 0.1 to 50 μm. If the particles 14 of the crystalline inorganic material have an average particle size of from 0.1 to 50 μm, the surface area of the crystalline inorganic material in the melt layer is in a suitable range upon formation of the melt layer by applying the material to the surface of the base 11 and heating the material. Accordingly, the coating layer in the molten state has viscosity which is not excessively low and is maintained in a suitable range, so that the coating layer on the bump is not likely to flow onto the flat portion 11a. Thus, the surface coat layer of the resulting structure has thicknesses not greatly different in the first coat portion 12a formed on the flat portion 11a and the second coat portions 12b formed on portions such as a bump.

If the particles 14 of the crystalline inorganic material contained in the surface coat layer 12 have an average particle size of smaller than 0.1 μm, the particle size of the particles 14 of the crystalline inorganic material is excessively small, and thus the surface area of the crystalline inorganic material in the melt layer increases. The melt layer containing such particles 14 of the crystalline inorganic material has excessively high viscosity, failing to form the surface coat layer 12 having a uniform thickness. If the particles 14 of the crystalline inorganic material have an average particle size of larger than 50 μm, the particle size of the particles 14 of the crystalline inorganic material is excessively large, and thus the surface area of the crystalline inorganic material in the melt layer is excessively small. The melt layer containing such particles 14 of the crystalline inorganic material has low viscosity, and is likely to flow. As a result, the thickness of the resulting second coat portions 12b is small, giving a thickness ratio of the second coat portions 12b to the first coat portion 12a of lower than 0.4.

The particles 14 of the crystalline inorganic material more preferably have an average particle size of from 0.1 μm to less than 10 μm.

The particles 14 of the crystalline inorganic material preferably constitute from 5% by weight to less than 20% by weight of the surface coat layer 12.

If the particles 14 of the crystalline inorganic material constitute lower than 5% by weight of the surface coat layer 12, the percentage by weight of the crystalline inorganic material is excessively low, and thus the amount of the amorphous inorganic material per unit volume is large. Therefore, the viscosity of the melt layer decreases to bring difficulties in increasing the thickness of the melt layer on a portion such as a bump, resulting in a thickness ratio of the second coat portions 12b to the first coat portion 12a of lower than 0.4. In contrast, if the particles 14 of the crystalline inorganic material constitute higher than 20% by weight of the surface coat layer 12, the probability of collisions between the particles of the crystalline inorganic materials is high. As a result, the particles of the crystalline inorganic material easily agglomerate, making it difficult to produce a uniform film. Consequently, variation in properties such as thermal properties depending on sites will easily occur.

Since the particles of the crystalline inorganic material in the embodiment of the present invention have an average particle size of from 0.1 to 50 μm as described above, the viscosity of the coating layer in the molten state, obtained by applying a coating composition for forming the surface coat layer 12 and firing the composition, is in a suitable range. Hence, the second coat portions 12b on the bump 11b and the edge portion 11c are not likely to be thin. As a result, the thickness of the second coat portions 12b does not greatly differ from the thickness of the first coat portions 12a.

The first coat portion 12a preferably has a thickness of from 50 to 1000 μm, and more preferably from 100 to 750 μm. The second coat portions 12b each preferably have a thickness that is in a ratio of from 0.4 to less than 1.0 relative to the first coat portion 12a.

If the first coat portion 12a has a thickness of smaller than 50 μm, the thickness of the whole surface coat layer 12 is excessively small, and thus the heat insulation performance decreases, failing to raise the temperature of the base sufficiently. If the first coat portion 12a has a thickness of larger than 1000 μm, the thickness of the whole surface coat layer 12 is excessively large. In this case, when the structure is subjected to thermal shock, the temperature of the contact surface between the surface coat layer 12 and the base 11 tends to be greatly different from the temperature of the surface exposed to the air, leading to easy breakage of the surface coat layer 12.

The amorphous inorganic material constituting the surface coat layer 12 of the structure preferably contains low melting glass that has a softening point of 300° C. to 1000° C. The amorphous inorganic material as used herein can be low melting glass having a softening point within the above range both in the case of forming the first coat portion 12a and in the case of forming the second coat portions 12b.

The low melting glass is not particularly limited, but preferably contains at least one of barium glass, boron glass, strontium glass, alumina-silica glass, soda zinc glass, and soda barium glass.

The low melting glass may contain a single kind or multiple kinds of glass as described above.

If the low melting glass has a softening point in the range of from 300° C. to 1000° C., the surface coat layer 12 having excellent adhesion to the base can be easily formed on the base made of a metal by applying the molten low melting glass (i.e. performing the coating) to the surface of the base (metal material), and heating and firing the molten glass.

If the low melting glass has a softening point of lower than 300° C. which is excessively low as a softening point, the layer for forming the surface coat layer under heat is molten, for example, to easily flow to give a small thickness to the layer. In contrast, if the low melting glass has a softening point of higher than 1000° C., it is necessary to set the temperature for the heating at a very high temperature, and the heating may deteriorate the mechanical properties of the base.

The softening point can be measured by the method in accordance with JIS R 3103-1:2001 using, for example, an automatic measuring apparatus of glass softening and strain points (SSPM-31) from OPT Corp.

Here, also in the case that a semicylindrical base or a cylindrical base is used for the structure of the embodiment of the present invention, the surface coat layer 12 (the first coat portion 12a and the second coat portions 12b) is formed on portions of the base corresponding to the flat portion 11a and a portion such as the bump 11b in the structure 10 illustrated in FIG. 1. As described above, the surface coat layer 12 may be formed on both faces of the base 11.

Even in the case that the surface coat layer 12 is formed on both faces of the base 11, the first coat portion 12a constituting the surface coat layer 12 preferably has a thickness of from 50 to 1000 μm.

In the embodiment of the present invention, an overcoat layer may be formed on the surface coat layer.

The kinds and the properties of the particles of a crystalline inorganic material and the amorphous inorganic material constituting the overcoat layer can be the same as those of the crystalline inorganic material particles and amorphous inorganic material constituting the surface coat layer. The particles of the crystalline inorganic material and the amorphous inorganic material constituting the surface coat layer have been described above, and thus are not described again here.

In the case that an overcoat layer is formed on the surface coat layer, the particles of the crystalline inorganic material in the overcoat layer preferably have an average particle size of from 0.1 to 50 μm, and they also preferably constitute from 0.1 to 20% by weight of the whole of the overcoat layer.

If the particles of the crystalline inorganic material contained in the overcoat layer have an average particle size of smaller than 0.1 μm, the particle size of the particles of the crystalline inorganic material is excessively small, and thus the surface area of the particles of the crystalline inorganic material in the melt layer is large. The paint containing such particles has excessively high viscosity which causes unfavorable coating, giving high surface roughness to the overcoat layer. If the particles of the crystalline inorganic material have an average particle size of larger than 50 μm, the particle size of the particles of the crystalline inorganic material is excessively large, and thus the volume of the amorphous inorganic material per unit volume is large. The melt layer containing such particles of the crystalline inorganic material has excessively low viscosity, and thus flows easily, which is likely to give uncoated parts.

The overcoat layer may or may not contain a crystalline inorganic material. From the viewpoint of improving the smoothness of the overcoat layer, the overcoat layer preferably does not contain a crystalline inorganic material. However, from the viewpoint of improving the heat resistance of the overcoat layer, the overcoat layer preferably contains a crystalline inorganic material. In this case, the proportion of the particles of the crystalline inorganic material in the overcoat layer is preferably from 0.1 to 20% by weight.

If the proportion of the particles of the crystalline inorganic material in the overcoat layer is higher than 20% by weight, the concentration of the crystalline inorganic material is high in the paint composition, which gives high viscosity to the paint. Accordingly, a good coating film cannot be formed, so that the surface roughness of the resulting overcoat layer is high.

Since the particles of the crystalline inorganic material in the overcoat layer are defined to have an average particle size as described above herein, a flat layer having a low surface roughness can be formed so that gases flowing over the overcoat layer can smoothly flow. Thereby, the structure of the embodiment of the present invention exhibits improved heat insulation properties.

The overcoat layer preferably has a thickness of from 5 to 25 μm, and a surface roughness $Rz_{JIS}$ measured at a measurement interval of 10 mm in accordance with JIS B 0601 (2001) of from 0.05 to 10 μm.

It is technically difficult to form an overcoat layer having a surface roughness $Rz_{JIS}$ of lower than 0.05 μm. If the overcoat layer has a surface roughness $Rz_{JIS}$ of higher than 10 μm which is excessively high, gases do not smoothly flow over the overcoat layer, and thus formation of an overcoat layer could not improve the heat insulation properties.

Next, the method for producing the structure of the embodiment of the present invention is described.

First, the paint for forming a surface coat layer used in production of the structure of the embodiment of the present invention is described.

The paint is used for forming a surface coat layer on a base that is made of a metal and has a flat portion and at least one of a bump and an edge portion on its surface.

That is, the paint of the embodiment of the present invention contains an amorphous inorganic material and particles of a crystalline inorganic material, and the particles of a crystalline inorganic material have an average particle size of from 0.1 to 50 μm.

The paint of the embodiment of the present invention can be used in production of the structure of the embodiment of the present invention having the features described above. Here, the use of the paint is not limited to production of the structure, and the paint may be used in formation of a coating film or any other process.

The properties (e.g. kind, material, thickness, shape), the bumps, the edge portions, and the like conditions of the base to which the paint of the embodiment of the present invention is applied can be the same as those described for the structure of the embodiment of the present invention.

The paint of the embodiment of the present invention contains an amorphous inorganic material and particles of a crystalline inorganic material, and may also contain other substances such as a dispersion medium and an organic binder.

The crystalline inorganic material in the paint is a material for forming the surface coat layer of the structure described above, and therefore can be the same as the particles of the crystalline inorganic material contained in the surface coat layer. The kind and other conditions of the crystalline inorganic material have already been described above for the structure, and are not described again here. The particles of the crystalline inorganic material contained in the paint have an average particle size of from 0.1 to 50 μm.

If the particles of the crystalline inorganic material contained in the paint have an average particle size of smaller than 0.1 μm, the particle size of the particles of the crystalline inorganic material is excessively small, and thus the surface area of the particles of the crystalline inorganic material in the melt layer increases. The melt layer containing such particles of the crystalline inorganic material has excessively high viscosity, failing to form a surface coat layer having a uniform thickness. If the particles of the crystalline inorganic material have an average particle size of larger than 50 μm, the particle size of the particles of the crystalline inorganic material is excessively large, and thus the surface area of the particles of the crystalline inorganic material in the melt layer is excessively small. The melt layer containing such particles of the crystalline inorganic material has low viscosity, and is likely to flow. As a result, the thickness of the resulting second coat portions is small, giving a thickness ratio of the second coat portions to the first coat portion of lower than 0.4.

The crystalline inorganic material in the paint after subjected to wet grinding eventually have an average particle size of from 0.1 μm to less than 10 μm.

The crystalline inorganic material preferably constitutes from 5% by weight to less than 20% by weight of the total amount of the amorphous inorganic material and the crystalline inorganic material contained in the paint for forming a surface coat layer.

If the crystalline inorganic material constitutes from 5% by weight to less than 20% by weight of the total amount of the amorphous inorganic material and the crystalline inorganic material contained in the paint for forming a surface coat layer, the amount of the amorphous inorganic material per unit volume is in a suitable range, and therefore the viscosity of the melt layer is also in a suitable range. Hence, a surface coat layer having a thickness not greatly different from its thickness on a flat portion can be formed on a portion such as a bump.

In the paint for forming a surface coat layer, the percentage by weight of the particles of the crystalline inorganic material in the total amount of the amorphous inorganic material and the particles of the crystalline inorganic material is the same as the percentage by weight of the crystalline inorganic material in the surface coat layer of the structure of the embodiment of the present invention.

Since the paint contains substances such as a dispersion medium as well as the amorphous inorganic material and the crystalline inorganic material particles, the proportion of the particles of the crystalline inorganic material in the paint may also be represented by a percentage by weight of the particles of the crystalline inorganic material in the weight of the whole paint. In this case, the proportion is represented as the concentration of the particles of the crystalline inorganic material in the paint.

The concentration of the crystalline inorganic material in the paint is preferably from 2 to 9% by weight, and more preferably from 3 to 5% by weight.

The properties (e.g. kind, material) and the like conditions of the amorphous inorganic material can be the same as those described for the structure of the embodiment of the present invention, and are therefore not described again here. In the structure, the amorphous inorganic material is formed into an amorphous layer through coating, heating, and melting, whereas in preparation of the paint for forming a surface coat layer, the amorphous inorganic material is used in the form of powder. To prepare the paint of the embodiment of the present invention, the materials are mixed first, and the mixed materials are subjected to wet grinding. Here, the particle size of the powder of an amorphous inorganic material used is adjusted to an appropriate particle size, and after the mixing, the powder is made to have a desired particle size through the wet grinding.

As described above, since the amorphous inorganic material is to be formed into a layer on the surface of the base through coating, firing, and melting, the particle size of the amorphous inorganic material is not required to be exactly controlled. The particles of the amorphous inorganic material, however, need to be uniformly dispersed in the paint.

From this viewpoint, the amorphous inorganic material for the paint composition after the wet grinding eventually has an average particle size of from 0.1 to 100 $\mu$m, and more preferably from 1 to 20 $\mu$m. If the average particle size is in the range of from 1 to 20 $\mu$m, the particles tend to be uniformly dispersed because, supposedly, the influence of the electricity charged on the surface of the particles is small.

Examples of the dispersion medium include water and organic solvents such as methanol, ethanol, and acetone. The blending ratio of the dispersion medium to the powder of the amorphous inorganic material in the paint is not particularly limited, but is preferably, for example, from 50 to 150 parts by weight for each 100 parts by weight of the powder of the amorphous inorganic material. This is because such a ratio can give a viscosity suitable for applying the paint to the base.

Examples of the organic binder that can be mixed into the paint include polyvinyl alcohol, methyl cellulose, ethyl cellulose, and carboxymethyl cellulose. These may be used alone or in combination.

Also, the dispersion medium and the organic binder(s) may be used in combination.

Next, formation of the overcoat layer on the surface coat layer is described.

In the case of forming an overcoat layer on the surface coat layer, the overcoat layer may be formed by applying the paint for forming a surface coat layer to the surface of the base, heating and melting the paint to form a surface coat layer, applying the paint for forming an overcoat layer thereto, and heating the paint for forming an overcoat layer. Still, it is preferred to simultaneously form a surface coat layer and an overcoat layer by applying the paint for forming a surface coat layer to the surface of the base, drying the paint to form a coating film, applying the paint for forming an overcoat layer, drying the paint to form a coating film for an overcoat, and then heating and firing the films. This process is preferred because the surface coat layer and the overcoat layer can be simultaneously formed by performing the heating and firing once.

The paint for forming an overcoat layer may contain particles of an amorphous inorganic material and a crystalline inorganic material, or may contain only particles of an amorphous inorganic material. The paint for forming an overcoat layer may also contain other substances such as a dispersion medium and an organic binder.

In the case that the paint for forming an overcoat layer contains a crystalline inorganic material, the crystalline inorganic material used is the material for forming the overcoat layer on the structure as described above, and therefore can be the same as the crystalline inorganic material contained in the overcoat layer constituting the structure. The kind and other conditions of the crystalline inorganic material have already been described above for the structure, and are not described again here. The particles of a crystalline inorganic material contained in the paint for forming an overcoat layer preferably have an average particle size of from 0.1 to 50 $\mu$m, and the particles of the crystalline inorganic material preferably constitute from 0.1 to 20% by weight of the total amount of the amorphous inorganic material and the crystalline inorganic material in the paint for forming an overcoat layer. Here, the blending proportion of the particles of the crystalline inorganic material in the total amount of the amorphous inorganic material and the crystalline inorganic material in the paint for forming an overcoat layer is determined by the same method as in the case of the paint for forming a surface coat layer.

If the blending proportion of the particles of the crystalline inorganic material in the total amount of the amorphous inorganic material and the crystalline inorganic material in the paint for forming an overcoat layer is higher than 20% by weight, the paint has high viscosity and thus cannot form a favorable coating film, which increases the surface roughness of the resulting overcoat layer.

The properties (e.g. kind, material) and the like conditions of the amorphous inorganic material can be the same as those described for the structure of the embodiment of the present invention, and are therefore not described again here. In the structure, the amorphous inorganic material is formed into an amorphous layer through coating, heating, and melting, whereas in preparation of the paint for forming a surface coat layer, the amorphous inorganic material is used in the form of powder. To prepare the paint of the embodiment of the present invention, the materials are mixed first, and the mixed materials are subjected to wet grinding. Here, the particle size of the powder of an amorphous inorganic material used is adjusted to an appropriate particle size, and after the mixing, the powder is made to have a desired particle size through the wet grinding.

As described above, since the amorphous inorganic material is to be formed into a layer on the surface of the base through coating, firing, and melting, the particle size of the amorphous inorganic material is not required to be exactly controlled. The particles of the amorphous inorganic material, however, need to be uniformly dispersed in the paint.

From this viewpoint, the amorphous inorganic material for the paint for forming an overcoat layer after the wet grinding eventually has an average particle size of from 0.1 to 50 $\mu$m, and more preferably from 1 to 20 $\mu$m. If the average particle size is in the range of from 1 to 20 $\mu$m, the particles tend to be uniformly dispersed because, supposedly, the influence of the electricity charged on the surface of the particles is small.

Examples of the dispersion medium and the organic binder contained in the paint for forming an overcoat layer include the same ones suggested as examples for the paint for forming a surface coat layer. The blending ratio of the dispersion medium to the powder of the amorphous inorganic material in the paint is not particularly limited, but is preferably, for example, from 50 to 150 parts by weight for each 100 parts by weight of the powder of the amorphous inorganic material.

Next, the preparation of a paint for forming a surface coat layer described above and a method for producing an exhaust system component using the paint are described.

(1) Preparation of Base Made of Metal

A base made of a metal (hereinafter, also referred to as a metal base or a metal material) as a starting material is subjected to a washing treatment for removal of impurities on the surface of the metal base.

The washing treatment is not particularly limited, and can be a conventionally known washing treatment. Specific examples thereof include ultrasonic washing in an alcohol solvent.

After the washing treatment, a roughening treatment may be performed on the surface of the metal base according to need such that the specific surface area of the metal base is increased or the surface roughness of the metal base is adjusted. Specific examples thereof include roughening treatments such as a sandblasting treatment, an etching treatment, and a high-temperature oxidation treatment. These treatments may be performed alone or in combination.

After the roughening treatment, the washing treatment may be further performed.

(2) Process of Forming Surface Coat Layer

Materials such as a crystalline inorganic material and an amorphous inorganic material are mixed to prepare a paint for forming a surface coat layer.

Specifically, a paint for forming a surface coat layer is prepared by, for example, preparing powder of the crystalline inorganic material and powder of the amorphous inorganic material each having the predetermined particle size, shape, and the like properties, dry-blending the powder materials in a predetermined blending ratio to prepare a powder mixture, adding water to the mixture, and wet-mixing the mixture with a ball mill.

Here, the blending ratio of the powder mixture to water is not particularly limited, but is preferably 100 parts by weight for each 100 parts by weight of the powder mixture. This is because such a ratio can give a viscosity suitable for applying the paint to the metal base. Also, according to need, the paint for forming a surface coat layer may contain additives such as a dispersion medium (e.g. organic solvent) and an organic binder.

(3) Next, the paint for forming a surface coat layer is applied to the entire surface of the metal base, including the flat portion and at least one of the bumps and the edge portions.

Specific examples of the method for applying the paint composition include spray coating, electrostatic coating, inkjet printing, transfer with an instrument such as a stamp and a roller, brush coating, and electrodeposition.

After drying the coating film for a surface coat layer, a coating film for an overcoat is formed according to need by preparing a paint for forming an overcoat layer, applying the paint for forming an overcoat layer to the coating film for a surface coat layer, and drying the paint.

(4) Then, the metal base on which the coating film for a surface coat layer is formed is subjected to a firing treatment.

Specifically, the metal base to which the coating composition was applied is dried, heated and fired, so that a surface coat layer is formed. In the case of forming a coating film for an overcoat layer, an overcoat layer is formed on the surface coat layer.

The firing temperature is preferably not lower than the softening point of the amorphous inorganic material, and is thus preferably from 700° C. to 1100° C., although it depends on the kind of the amorphous inorganic material. This is because setting the firing temperature to a temperature not lower than the softening point of the amorphous inorganic material allows the metal base and the amorphous inorganic material to adhere firmly to one another, allowing the first coat portion and the second coat portions to firmly adhere to the metal base.

The above procedure enables production of the exhaust system component illustrated in FIG. 1 which is an example of the structure of the embodiment of the present invention.

Figure 2A:
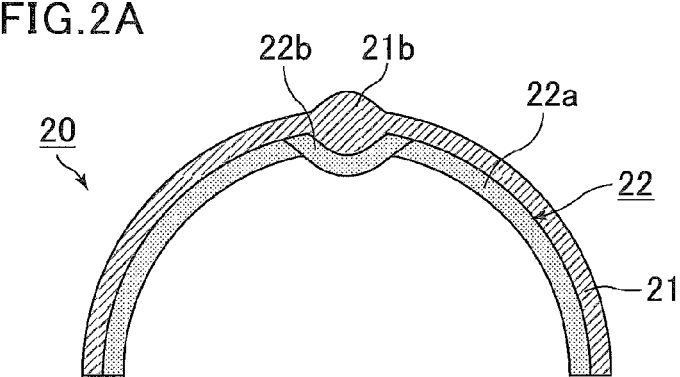
FIG. 2A is a cross-sectional view schematically illustrating a member obtained by cutting in half a tubiform body as a base serving as an exhaust system component (hereinafter, such a member is referred to as a half-cut member)
Figure 2B:
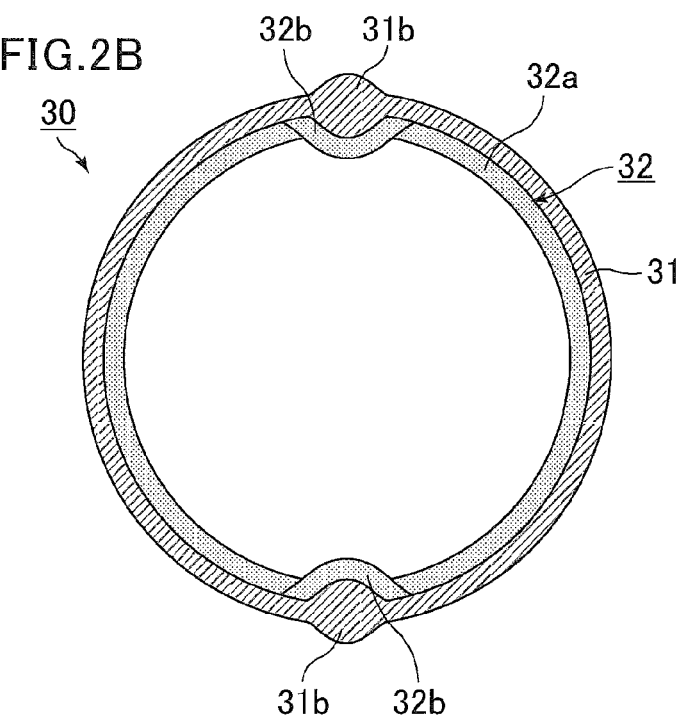
FIG. 2B is a cross-sectional view schematically illustrating the exhaust system component in the case that the base is a tubiform body.
Figure 2C:
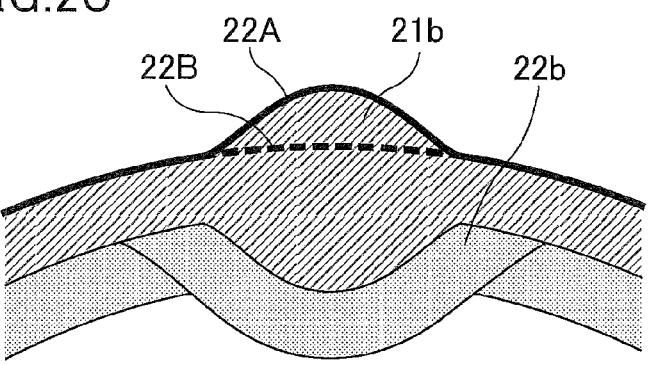
FIG. 2C is an enlarged cross-sectional view of the vicinity of a bump in the half-cut member illustrated in FIG. 2A.

FIG. 2A is a cross-sectional view schematically illustrating a member obtained by cutting in half a tubiform body as a base serving as an exhaust system component (hereinafter, such a member is referred to as a half-cut member); FIG. 2B is a cross-sectional view schematically illustrating the exhaust system component in the case that the base is a tubiform body; and FIG. 2C is an enlarged cross-sectional view of the vicinity of a bump in the half-cut member illustrated in FIG. 2A.

An exhaust system component 30 illustrated in FIG. 2B includes a base 31 that is a tubiform body having the shape of an exhaust pipe, and partly has bumps 31b. The base 31 has, on its inside, a surface coat layer 32 (including a first coat portion 32a covering the flat portion and second coat portions 32b covering the bumps 31b).

Such an exhaust pipe including the surface coat layer 32 formed inside the base 31 has very high heat insulation properties. Therefore, use of this exhaust pipe enables an increase in the temperature to the catalyst activation temperature in a short time from the start of the engine, allowing the catalytic converter to work sufficiently from the start of the engine.

A method for producing such an exhaust system component including a tubiform body as the base and a surface coat layer formed inside the tubiform body is described below.

In the case that the exhaust system component (tubiform body) 30 illustrated in FIG. 2B is long, it is not impossible to form a surface coat layer on the entire inner surface, but is difficult. Hence, generally, an exhaust system component (half-cut members) 20 (illustrated in FIG. 2A) obtained by cutting in half the tubiform body of the base constituting the exhaust system component is used.

In this case, the exhaust system component 30 including the surface coat layer 32 (including the first coat portion 32a and the second coat portions 32b) formed on the inner surface of the base 31 is produced by forming the surface coat layer 22 on the surface of the base 21, and combining two exhaust system components (half-cut members) 20 together.

Here, a first half-cut member and a second half-cut member obtained by halving a tubiform body are prepared as the metal base. To the surface with a smaller area, i.e., inner surface, of each of the first half-cut member and the second half-cut member, a paint composition is applied. The first half-cut member and the second half-cut member are then subjected to the firing treatment, so that a surface coat layer including second coat portions is formed on the first half-cut member and the second half-cut member. After that, the first half-cut member and the second half-cut member are bonded to one another by welding, for example, whereby a tubiform body is obtained.

This procedure allows production of an exhaust system component including a tubiform body as the metal base and a surface coat layer formed on the inner surface of the tubiform body.

Hereinafter, the effects of the structure and the paint for forming a surface coat layer according to the embodiment of the present invention are listed.

(1) The structure of the embodiment of the present invention includes a base and a surface coat layer that is formed from an amorphous inorganic material and particles of a crystalline inorganic material, the surface coat layer having a thickness ratio of the second coat portion to the first coat portion (second coat portion thickness/first coat portion thickness) of from 0.4 to less than 1.0, the particles of the crystalline inorganic material having an average particle size of from 0.1 to 50 µm. Accordingly, in a melt layer formed by melting a coating layer of a paint containing an amorphous inorganic material and a crystalline inorganic material under heat, the surface area of the particles of the crystalline inorganic material is in a suitable range. Also, the coating layer in the molten state has viscosity which is maintained in a suitable range, so that the coating layer in the molten state on a bump is not likely to flow onto a flat portion. Thus, the surface coat layer of the resulting structure has thicknesses not greatly different in the first coat portion formed on a flat portion and the second coat portion formed on a portion such as a bump. As a result, the whole structure can provide excellent properties including heat insulation properties and electrical insulation properties.

(2) In the structure of the embodiment of the present invention, if at least one of calcia, magnesia, ceria, alumina, and an oxide of a transition metal is contained as the crystalline inorganic material, generation of defects such as cracks due to deterioration of the mechanical strength of the surface coat layer can be prevented because particles of the crystalline inorganic material have excellent heat resistance and mechanically strengthen the surface coat layer. Especially, an oxide of aluminum contributes to improvement of the electrical insulation properties of an exhaust pipe. Also, if the surface coat layer contains an oxide of a transition metal as the crystalline inorganic material, the oxide of a transition metal, having a high infrared emissivity, gives a high infrared emissivity to the surface coat layer, and also contributes to excellent adhesion of the surface coat layer to the base.

(3) In the structure of the embodiment of the present invention, formation of a surface coat layer having a thickness of from 20 to 1000 µm enables formation of a surface coat layer having sufficiently high heat insulation properties throughout the layer, resulting in production of a structure having excellent properties including heat insulation properties and electrical insulation properties.

(4) In the structure of the embodiment of the present invention, if an overcoat layer containing the particles of a crystalline inorganic material having an average particle size of from 0.1 to 50 µm and constituting from 0.1 to 20% by weight of the whole of the overcoat layer is formed on the surface coat layer, formation of an overcoat layer having low viscosity when molten under heat on the surface coat layer enables formation of a smoother layer having small surface roughness, and allows smooth flow of gases such as exhaust gas flowing over the overcoat layer. Accordingly, the heat conductivity between gases such as exhaust gas and the structure is low, and therefore the heat insulation properties can be improved.

(5) In the structure of the embodiment of the present invention, if the amorphous inorganic material contains low melting glass that has a softening point of from 300° C. to 1000° C., a surface coat layer can be relatively easily formed by forming a coating layer on the surface of the base by coating or the like method, and heating the coating layer.

(6) Since the paint for forming a surface coat layer according to the embodiment of the present invention contains an amorphous inorganic material and particles of a crystalline inorganic material, and the particles of the crystalline inorganic material have an average particle size of from 0.1 to 50 µm, the structure of the embodiment of the present invention can be suitably produced by applying the paint for forming a surface coat layer to the flat portions and portions such as bumps and heating and melting the applied paints.

EXAMPLES

Hereinafter, examples showing the structure and the paint for forming a surface coat layer according to the embodiment of the present invention in more detail are described. These examples, however, are not intended to limit the scope of the present invention.

Example 1

(1) Preparation of Base Material

A plate-shaped stainless steel base material (made of SUS430) having a size of 40 mm (length)×40 mm (width)× 1.5 mm (thickness) including a semicylindrical weld bead having a height of 5 mm, a width of 10 mm, and a length of 40 mm was prepared as a metal base which is the application target. This metal base was subjected to ultrasonic washing in an alcohol solvent, and subsequently subjected to a sandblast treatment so that the surface (on both sides) of the metal base was roughened. The sandblast treatment was carried out using $Al_2O_3$ abrasive grains of #100 for 10 minutes.

With a surface-roughness measuring machine (HANDY SURF E-35B from Tokyo Seimitsu Co., Ltd.), the surface roughness of the metal base was determined with a measurement interval of 10 mm. The results showed that the surface roughness $Rz_{JIS}$ of the metal base material was 8.8 µm.

A plate-like base was produced by the above treatments.

(2) Preparation of Paint for Forming Surface Coat Layer $K_{4006}$A-100M ($Bi_2O_3$—$B_2O_3$ glass, softening point: 770° C.) from Asahi Glass Co., Ltd. was prepared as the powder of an amorphous inorganic material. The concentration of the amorphous inorganic material in the whole paint for forming a surface coat layer was 21% by weight. The concentration is the proportion of the amorphous inorganic material expressed in percentage in the total weight of the paint for forming a surface coat layer which contains materials such as water. The powder of the amorphous inorganic material had an average particle size of 15 µm.

To the paint, yttria-stabilized zirconia (YSZ) was blended as particles of a crystalline inorganic material. The percentage by weight of the crystalline inorganic material in the total amount of the amorphous inorganic material and the crystalline inorganic material was 19% by weight. The average particle size of the crystalline inorganic material was 10 µm.

Methyl cellulose from Shin-Etsu Chemical Co., Ltd. (product name: METOLOSE-65SH) was prepared as an organic binder, and blended in an amount that gives a concentration in the whole paint for forming a surface coat layer of 0.05% by weight.

In preparation of the paint for forming a surface coat layer to be used in formation of a surface coat layer, water was further added to the paint in an amount that gives a concentration of 7% by weight in the whole paint for forming a surface coat layer. The resulting mixture was wet-mixed with a ball mill, whereby a paint for forming a surface coat layer was prepared. The paint for forming an overcoat layer was not prepared.

The application target, properties of the paint for forming a surface coat layer (the kind of the crystalline inorganic material, the average particle size of the crystalline inorganic material, the percentage by weight of the crystalline inorganic material, the concentration of the amorphous inorganic material) are shown in Table 1.

The average particle size of the particles of the crystalline inorganic material is the average particle size of the particles of the crystalline inorganic material before adding the particles to the materials for forming a surface coat layer, using Laser Diffraction Particle Size Analyzer (SALD-300V) from Shimadzu Corporation.

(3) Production of Structure

The prepared paint for forming a surface coat layer was applied to one main surface and side surfaces of the base by spray coating, and the base was dried at 70° C. for 20 minutes in a dryer. Then, the base was heated and fired at 850° C. for 90 minutes in the air, and thereby a surface coat layer was formed.

(4) Evaluation of the Obtained Structure

Measurement of the thickness (thickness of the first coat portion and the thickness of the second coat portions), calculation of the thickness ratio (second coat portion thickness/first coat portion thickness), and evaluation of the properties of the surface coat layer (film formation evaluation on the flat portion, film formation evaluation on the bumps, surface roughness measurement of the surface coat layer or the overcoat layer, and the overall evaluation) were performed by the following methods.

(Measurement of Thickness)

The thickness of each of the first coat portion and the second coat portions of the obtained structure was measured using DUALSCOPE MP40 from Fischer Instruments K.K.

The thickness of the second coat portions was divided by the thickness of the first coat portion, and the resulting value was taken as the thickness ratio.

(Evaluation of Film Formation on Flat Portion and Bump)

Ten SEM photographs of the interface between the base and the surface coat layer formed on the surface of the base were taken with a scanning electron microscope (Hitachi Chemical Co., Ltd., FE-SEM S-4800). Using the SEM photographs, the structure was evaluated as "failed" if a gap was formed between the surface coat layer and the base and peeling was observed, and evaluated as "passed" if no gap was formed between the base and the surface coat layer.

(Measurement of Surface Roughness of Surface Coat Layer)

The ten point height of roughness profile $Rz_{JIS}$ was calculated from a roughness curve formed by measuring the surface roughness of the first coat portion with a surface-roughness measuring machine (HANDYSURF E-35B from TOKYO SEIMITSU CO., LTD.) in accordance with JIS B 0601 (2001), with a measurement interval of 10 mm.

(Overall Evaluation)

Based on the evaluation results of the film formation on the flat portion, the film formation on the bumps, and the thickness ratio, a structure to which "passed" was given under all the evaluations was evaluated as an acceptable product, and a structure to which "failed" was given under at least one evaluation was evaluated as a rejected product. Here, the thickness ratio was evaluated using the formula: "heat resistance R ($m^2$K/W)=thickness t (m)/heat conductivity λ (W/m·K)" which shows heat insulation level of the structure. A higher value of the heat resistance R means that the heat insulation level is higher, and the heat resistance R is proportional to the thickness t as shown by the formula. Therefore, the heat insulation level here was evaluated using the thickness t instead of determining the heat resistance R. Now, use of the thickness t instead of determining the heat resistance R is discussed from the viewpoint of the flow of gases. When gases flow over the surface of the structure having bumps and edge portions, the bumps and the edge portions of the structure receive a larger amount of heat from gases than the flat portion per unit area and unit time because the flow of gases is disturbed around the bumps and the edge portions. Accordingly, the heat insulation level of the whole structure increases as the thickness of the layer on the bumps and the edge portions increases, and this phenomenon is easily predictable. An exhaust pipe, one of the uses to which the embodiment of the present invention is applied, is considered to have sufficient heat insulation properties if it has a thickness ratio of at least 0.4. Hence, a thickness ratio of at least 0.4 was evaluated as "passed" in the thickness ratio evaluation.

Examples 2 to 8

A surface coat layer was formed in substantially the same manner as in Example 1, except that the kind of the base as the application target, the kind, average particle size, and percentage by weight of the crystalline inorganic material used to produce the paint for forming a surface coat layer, and the concentration of the amorphous inorganic material were changed as shown in Table 1. The application target, properties of the paint for forming a surface coat layer (the kind of the crystalline inorganic material, the average particle size of the crystalline inorganic material, the percentage by weight of the crystalline inorganic material, the concentration of the amorphous inorganic material), and the properties of the overcoat layer (the kind of crystalline inorganic material, the average particle size of the crystalline inorganic material, the percentage by weight of the crystalline inorganic material, the concentration of the amorphous inorganic material) are shown in Table 1.

(Preparation of Paint for Forming Overcoat Layer)

In Examples 3 and 6, a paint for forming an overcoat layer was prepared by the same method as the above-described method for preparing the paint for forming a surface coat layer.

In Examples 3 and 6, as in the case of the paint for forming a surface coat layer, K4006A-100M from Asahi Glass Co., Ltd. was used as powder of an amorphous inorganic material, in such an amount that the concentration of the amorphous inorganic material in the whole paint for forming an overcoat layer shown in Table 1 was achieved. As shown in Table 1, no crystalline inorganic material was used in Example 3, but α-alumina was used in Example 6.

Comparative Examples 1 to 4

A surface coat layer was formed in substantially the same manner as in Example 1, except that the kind of the base as the application target, the kind, average particle size, and percentage by weight of the crystalline inorganic material used to produce the paint for forming a surface coat layer, and the concentration of the amorphous inorganic material were changed as shown in Table 1. The application target, properties of the paint for forming a surface coat layer (the kind of the crystalline inorganic material, the average particle size of the crystalline inorganic material, the percentage by weight of the crystalline inorganic material, the concentration of the amorphous inorganic material), and the properties of the overcoat layer (the kind of crystalline inorganic material, the average particle size of the crystalline inorganic material, the percentage by weight of the crystalline inorganic material, the concentration of the amorphous inorganic material) are shown in Table 1.

The following evaluation results were given in Example 5: the thickness of the first coat portion: 200 μm, the thickness of the second coat portions: 150 μm, the thickness ratio (second coat portion thickness/first coat portion thickness): 0.75, the film formation on the flat portion: passed, the

TABLE 1

| | | Paint for forming surface coat layer | | | | Paint for forming overcoat layer | | | |
|---|---|---|---|---|---|---|---|---|---|
| | | Crystalline inorganic material | | | Amorphous inorganic material Concentration (wt %) *2 | Crystalline inorganic material | | | Amorphous inorganic material Concentration (wt %) *2 |
| | Application target | Kind | Average particle size (μm) | Percentage by weight (wt %) *1 | | Kind | Average particle size (μm) | Percentage by weight (wt %) *1 | |
| Example 1 | Plate | YSZ | 10 | 19 | 39 | — | — | — | — |
| Example 2 | Plate | α-alumina | 5 | 12.5 | 36 | — | — | — | — |
| Example 3 | Half-cut member | YSZ *3 | 0.1 | 5 | 42 | non | — | 0 | 38 |
| Example 4 | Cylinder | YSZ | 50 | 5 | 42 | — | — | — | — |
| Example 5 | Cylinder | α-alumina | 5 | 19 | 35 | — | — | — | — |
| Example 6 | Plate | α-alumina | 0.1 | 19 | 35 | α-alumina | 50 | 20 | 35 |
| Example 7 | Plate | α-alumina | 50 | 19 | 35 | — | — | — | — |
| Example 8 | Plate | YSZ | 10 | 5 | 42 | — | — | — | — |
| Comparative Example 1 | Plate | α-alumina | 0.05 | 35 | 31 | α-alumina | 0.1 | 5 | 38 |
| Comparative Example 2 | Plate | α-alumina | 60 | 35 | 31 | — | — | — | — |
| Comparative Example 3 | Plate | YSZ | 10 | 3 | 42 | — | — | — | — |
| Comparative Example 4 | Plate | — | — | 0 | 38 | — | — | — | — |

Note:
*1 Percentage by weight of crystalline inorganic material: percentage by weight of crystalline inorganic material in total amount of amorphous inorganic material and crystalline inorganic material
*2 Concentration of amorphous inorganic material: percentage by weight of amorphous inorganic material in total amount of paint composition
*3 YSZ: yttria-stabilized zirconia The following evaluation results were given in Example 1: the thickness of the first coat portion: 50 μm, the thickness of the second coat portions: 34.5 μm, the thickness ratio (second coat portion thickness/first coat portion thickness): 0.69, the film formation on the flat portion: passed, the film formation on the bumps: passed, the surface roughness ($Rz_{JIS}$) of the overcoat layer: 5 μm, and the overall evaluation: passed.

The following evaluation results were given in Example 2: the thickness of the first coat portion: 200 μm, the thickness of the second coat portions: 140 μm, the thickness ratio (second coat portion thickness/first coat portion thickness): 0.7, the film formation on the flat portion: passed, the film formation on the bumps: passed, the surface roughness ($Rz_{JIS}$) of the surface coat layer: 3 μm, and the overall evaluation: passed.

The following evaluation results were given in Example 3: the thickness of the first coat portion: 1000 μm, the thickness of the second coat portions: 800 μm, the thickness ratio (second coat portion thickness/first coat portion thickness): 0.8, the thickness of the overcoat layer: 25 μm, the film formation on the flat portion: passed, the film formation on the bumps: passed, the surface roughness ($Rz_{JIS}$) of the overcoat layer: 0.2 μm, and the overall evaluation: passed.

The following evaluation results were given in Example 4: the thickness of the first coat portion: 200 μm, the thickness of the second coat portions: 80 μm, the thickness ratio (second coat portion thickness/first coat portion thickness): 0.4, the film formation on the flat portion: passed, the film formation on the bumps: passed, the surface roughness ($Rz_{JIS}$) of the overcoat layer: 0.2 μm, and the overall evaluation: passed.

film formation on the bumps: passed, the surface roughness ($Rz_{JIS}$) of the surface coat layer: 7 μm, and the overall evaluation: passed.

The following evaluation results were given in Example 6: the thickness of the first coat portion: 150 μm, the thickness of the second coat portions: 135 μm, the thickness ratio (second coat portion thickness/first coat portion thickness): 0.9, the thickness of the overcoat layer: 20 μm, the film formation on the flat portion: passed, the film formation on the bumps: passed, the surface roughness ($Rz_{JIS}$) of the overcoat layer: 0.2 μm, and the overall evaluation: passed.

The following evaluation results were given in Example 7: the thickness of the first coat portion: 150 μm, the thickness of the second coat portions: 66 μm, the thickness ratio (second coat portion thickness/first coat portion thickness): 0.44, the film formation on the flat portion: passed, the film formation on the bumps: passed, the surface roughness ($Rz_{JIS}$) of the surface coat layer: 1 μm, and the overall evaluation: passed.

The following evaluation results were given in Example 8: the thickness of the first coat portion: 500 μm, the thickness of the second coat portions: 200 μm, the thickness ratio (second coat portion thickness/first coat portion thickness): 0.4, the film formation on the flat portion: passed, the film formation on the bumps: passed, the surface roughness ($Rz_{JIS}$) of the surface coat layer: 3 μm, and the overall evaluation: passed.

In Comparative Example 1, the particles of the crystalline inorganic material used had an average particle size of 0.05 μm which is excessively small. As a result, an applicable paint could not be prepared, and thus a coating film was not formed.

The following evaluation results were given in Comparative Example 2: the thickness of the first coat portion: 500 μm, the thickness of the second coat portions: 175 μm, the thickness ratio (second coat portion thickness/first coat portion thickness): 0.35 (heat insulation properties are insufficient), the film formation on the flat portion: passed, the film formation on the bumps: passed, the surface roughness ($Rz_{JIS}$) of the surface coat layer: 3 μm, and the overall evaluation: failed.

The following evaluation results were given in Comparative Example 3: the thickness of the first coat portion: 500 μm, the thickness of the second coat portions: 160 μm, the thickness ratio (second coat portion thickness/first coat portion thickness): 0.32 (heat insulation properties were insufficient), the film formation on the flat portion: passed, the film formation on the bumps: passed, the surface roughness ($Rz_{JIS}$) of the surface coat layer: 2.5 μm, and the overall evaluation: failed.

The following evaluation results were given in Comparative Example 4: the thickness of the first coat portion: 500 μm, the thickness of the second coat portions: 150 μm, the thickness ratio (second coat portion thickness/first coat portion thickness): 0.3 (heat insulation properties were insufficient), the film formation on the flat portion: passed, the film formation on the bumps: passed, the surface roughness ($Rz_{JIS}$) of the overcoat layer: 0.1 μm, and the overall evaluation: failed.

Hereinafter, a specific example of the structure of the embodiment of the present invention is described with reference to the drawings.

The structure of the embodiment of the present invention can be used for an exhaust pipe component used as a member constituting the exhaust system that is connected to the internal combustion engine such as an engine for passenger cars. The form of the exhaust system component described below is the same as the form of the structure described above except that the base is a tubiform body.

Specifically, the structure of the embodiment of the present invention is suitable as, for example, an exhaust manifold.

Hereinafter, the structure of the embodiment of the present invention is described based on an exemplary exhaust manifold connected to the internal engine such as an engine for passenger cars.

Figure 3:
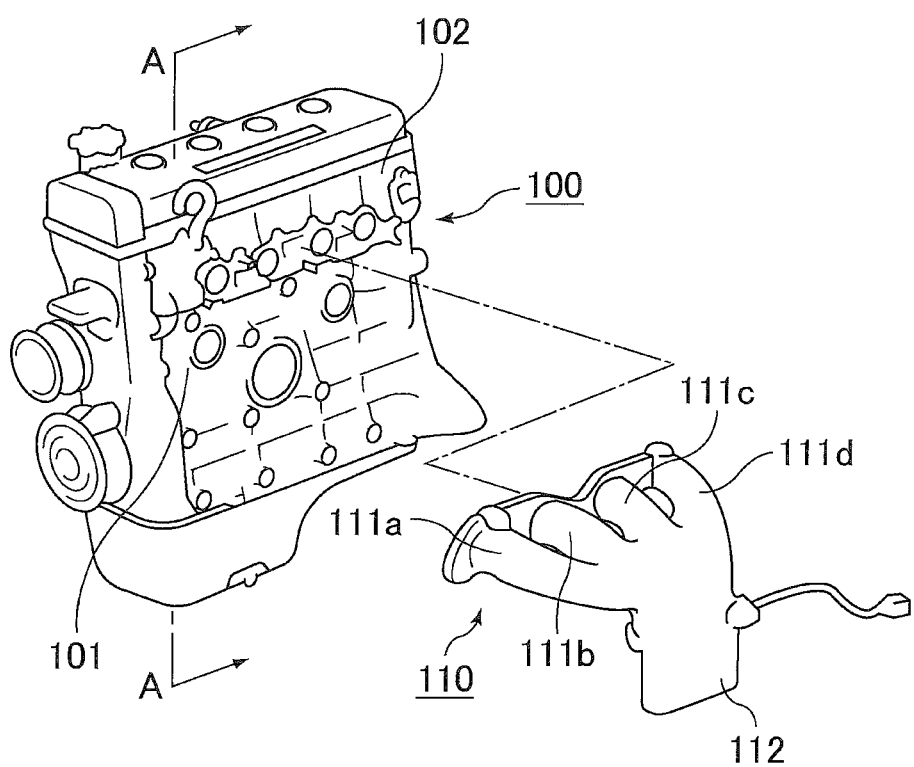
FIG. 3 is an exploded perspective view schematically illustrating a vehicle engine and an exhaust manifold connected to the vehicle engine which relate to the structure of the embodiment of the present invention.

FIG. 3 is an exploded perspective view schematically illustrating a vehicle engine and an exhaust manifold connected to the vehicle engine which relate to the structure of the embodiment of the present invention.

Figure 4A:
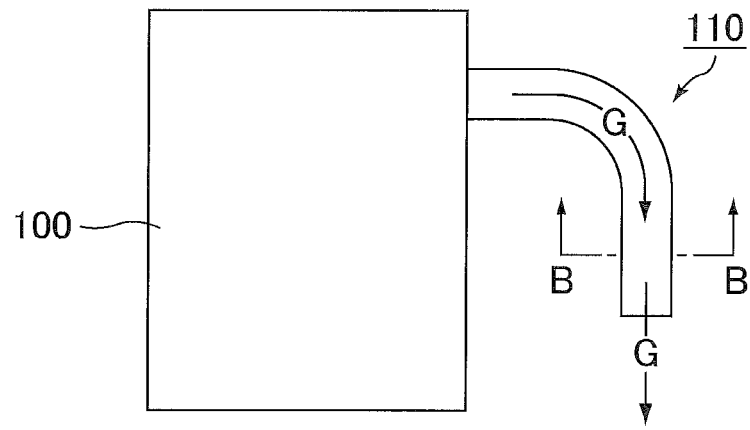
FIG. 4A is an A-A line cross-sectional view of the vehicle engine and the exhaust manifold illustrated in FIG. 3.
Figure 4B:
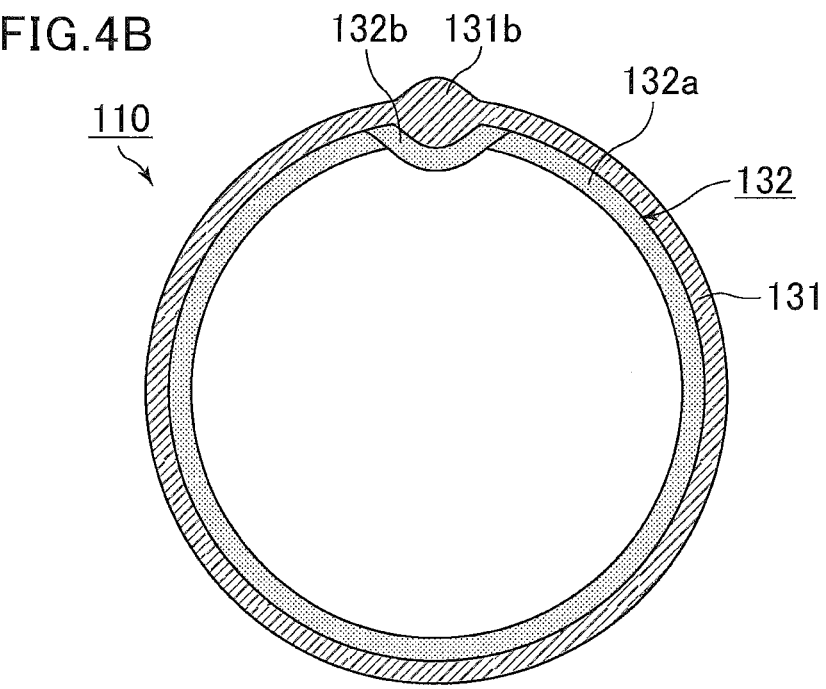
FIG. 4B is a B-B line cross-sectional view of the exhaust manifold illustrated in FIG. 4A.

FIG. 4A is an A-A line cross-sectional view of the vehicle engine and the exhaust manifold illustrated in FIG. 3; and FIG. 4B is a B-B line cross-sectional view of the exhaust manifold illustrated in FIG. 4A.

As illustrated in FIG. 3 and FIG. 4A, an engine 100 for passenger vehicles is connected to an exhaust manifold 110 (the structure illustrated in FIG. 1).

The engine 100 includes a cylinder block 101 at the top of which a cylinder head 102 is installed. To one side face of the cylinder head 102, the exhaust manifold 110 is mounted.

The exhaust manifold 110 has a glove-like shape, and includes branch pipes 111a, 111b, 111c, and 111d provided to correspond in number to the cylinders, and a collective portion 112 combining the branch pipes 111a, 111b, 111c, and 111d.

To the exhaust manifold 110, a catalytic converter provided with a catalyst supporting carrier is connected. The exhaust manifold 110 is configured to collect exhaust gas from each cylinder, and send the exhaust gas to a component such as the catalytic converter.

Exhaust gas G (in FIG. 4A, exhaust gas is indicated by G, and the direction in which the exhaust gas flows is indicated by arrows) discharged from the engine 100 flows into the catalytic converter through the exhaust manifold 110, purified by the catalyst supported by the catalyst supporting carrier, and flows out through a vent.

As illustrated in FIG. 4B, the exhaust manifold 110 (the structure of the embodiment of the present invention) includes a base 120 made of a metal and the surface coat layer 132 formed on the surface of the base 120.

In the exhaust manifold 110 (the structure of the embodiment of the present invention) illustrated in FIG. 4B, the base 120 is a tubiform body, and the surface coat layer 132 is formed on the inner surface of the base 120.

In the structure (exhaust manifold) of the embodiment of the present invention, the form of the surface coat layer can be the same as that of the surface coat layer of the structure described above.

FIG. 4B shows an example in which the form of the surface coat layer 132 included in the exhaust manifold 110 is the same as that of the surface coat layer 12 in the structure 10 illustrated in FIG. 1. The exhaust manifold 110 includes the second coat portions 132b on the bumps 131b. Although not illustrated, the amorphous inorganic material includes particles of the crystalline inorganic material dispersed therein.

The structure (exhaust manifold) of the embodiment of the present invention preferably has the surface coat layer on the entire inner surface of the base. This is because the area of the surface coat layer coming into contact with exhaust gases in this case is the maximum, which gives especially good heat resistance. The surface coat layer, however, may be formed on part of the inner surface of the base.

Also in the structure of the embodiment of the present invention, the surface coat layer may be formed on the outer surface, as well as the inner surface, of the base, or may be formed only on the outer surface.

Hereinabove, the structure of the embodiment of the present invention has been described as an exhaust manifold used as an exhaust system component, but the structure of the embodiment of the present invention can be suitably used as, for example, an exhaust pipe, a pipe constituting a catalytic converter, or a turbine housing, as well as an exhaust manifold.

The number of the branch pipes constituting the exhaust manifold is not particularly limited if it is the same as the number of cylinders of the engine. Here, the engine is, for example, a single cylinder engine, a two-cylinder engine, a four-cylinder engine, a six-cylinder engine, or an eight-cylinder engine.

The structure of the embodiment of the present invention described here is the same as the structure of the embodiment of the present invention described based on FIG. 1 except for the shape of the base. Hence, an exhaust system component can be produced in the same manner as in production of the above structure.

In the case of forming the surface coat layer on the inner surface of the base in the structure of the embodiment of the present invention, a base consisting of a first half-cut member and a second half-cut member as described above is preferably used.

The structure of the embodiment of the present invention described here can also achieve the same effects as the effects (1) to (5) of the structure and the paint for forming a surface coat layer described based on FIG. 1.

In the structure of the embodiment of the present invention, the surface coat layer may not necessarily be formed on the entire surface of the base.

For example, in the case of using the structure of the embodiment of the present invention as an exhaust pipe, the surface coat layer may be formed on the inner surface of a tubiform body as a base. In the case of forming a surface coat layer on the inner surface of the tubiform body, however, the surface coat layer needs not be formed on the entire inner surface of the tubiform body as a base if it is formed at least on the parts with which exhaust gas directly comes into contact.

The structure of the embodiment of the present invention essentially features a base that is made of a metal, and has a flat portion and at least one of a bump and an edge portion on its surface; a surface coat layer that is formed from an amorphous inorganic material and particles of a crystalline inorganic material, and covers the surface of the base, the surface coat layer including a first coat portion covering the flat portion and a second coat portion covering the at least one of a bump and an edge portion, the surface coat layer having a thickness ratio of the second coat portion to the first coat portion (second coat portion thickness/first coat portion thickness) of from 0.4 to less than 1.0, the particles of the crystalline inorganic material having an average particle size of from 0.1 to 50 μm.

The desired effects can be achieved by appropriately combining this essential feature with the above-described various configurations (e.g. form of the surface coat layer, the shape of the base, exhaust manifold).

Obviously, numerous modifications and variations of the present invention are possible in light of the above teachings. It is therefore to be understood that within the scope of the appended claims, the invention may be practiced otherwise than as specifically described herein.

The invention claimed is:

1. A structure comprising:
a base that is made of a metal, and has a flat portion and at least one of a bump having a width of from 0.01 to 20 mm and an edge portion on a surface; and
a surface coat layer that is formed from an amorphous inorganic material and particles of a crystalline inorganic material, and covers the surface of the base,
the surface coat layer including a first coat portion covering the flat portion and a second coat portion covering the at least one of the bump and the edge portion,
the surface coat layer having a thickness ratio of the second coat portion to the first coat portion (second coat portion thickness/first coat portion thickness) of from 0.4 to less than 1.0,
the particles of the crystalline inorganic material having an average particle size of from 0.1 to 50 μm.

2. The structure according to claim 1,
wherein the particles of the crystalline inorganic material constitute from 5% by weight to less than 20% by weight of the surface coat layer.

3. The structure according to claim 1,
wherein the particles of the crystalline inorganic material have an average particle size of from 0.1 μm to less than 10 μm.

4. The structure according to claim 1,
wherein the first coat portion has a thickness of from 50 to 1000 μm.

5. The structure according to claim 1, further comprising an overcoat layer formed on the surface coat layer,
wherein the overcoat layer is free from the crystalline inorganic material or contains from 0.1 to 20% by weight of the crystalline inorganic material, and
in the case that the crystalline inorganic material is contained in the overcoat layer, the crystalline inorganic material has an average particle size of from 0.1 to 50 μm.

6. The structure according to claim 5,
wherein the overcoat layer has a surface roughness $Rz_{JIS}$ in accordance with JIS B 0601 (2001) of from 0.05 to 10 μm.

7. The structure according to claim 1,
wherein the crystalline inorganic material contains at least one selected from the group consisting of calcia, magnesia, ceria, alumina, and an oxide of a transition metal.

8. The structure according to claim 1,
wherein the crystalline inorganic material contains at least one selected from the group consisting of α-alumina and yttria-stabilized zirconia.

9. The structure according to claim 1,
wherein the amorphous inorganic material contains low melting glass that has a softening point of from 300° C. to 1000° C.

10. The structure according to claim 9,
wherein the low melting glass contains at least one of barium glass, boron glass, strontium glass, alumina-silica glass, soda zinc glass, and soda barium glass.

11. The structure according to claim 1,
wherein the bump has a height with respect to the flat portion, and
wherein the height is from 0.01 to 15 mm.

* * * * *